United States Patent [19]
Hall et al.

[11] 3,956,632
[45] May 11, 1976

[54] CONVEYOR BELT POSITION MONITORING DEVICE

[75] Inventors: Derek Hall; Donald F. Beddell, both of San Jose, Calif.

[73] Assignee: FMC Corporation, San Jose, Calif.

[22] Filed: June 30, 1975

[21] Appl. No.: 591,685

[52] U.S. Cl. .............................. 250/223 R; 250/548
[51] Int. Cl.² ........................................ G01D 21/04
[58] Field of Search ........... 250/223, 571, 572, 561, 250/239, 221, 222, 548

[56] References Cited
UNITED STATES PATENTS

| | | | |
|---|---|---|---|
| 3,323,700 | 6/1967 | Epstein et al. | 250/548 |
| 3,582,663 | 6/1971 | Troast et al. | 250/223 |

Primary Examiner—Alfred E. Smith
Assistant Examiner—David C. Nelms
Attorney, Agent, or Firm—R. S. Kelly; J. F. Schipper; C. E. Tripp

[57] ABSTRACT

Means for automatically positioning light sensing means relative to a linear series of light sensitive areas, e.g., apertures, on a longitudinally moving conveyor belt which is monitored by the sensing means. Rollers are used to receive the side edges of the belt, such rollers being freely rotatable so as to reduce the tendency of the belt edges to fray or otherwise degrade. The light sensing means and rollers are both mounted on a suspended frame means which moves transversely in response to transverse movements of the belt, whereby the sensing means is always aligned with the linear series of light sensitive areas on the belt.

9 Claims, 3 Drawing Figures

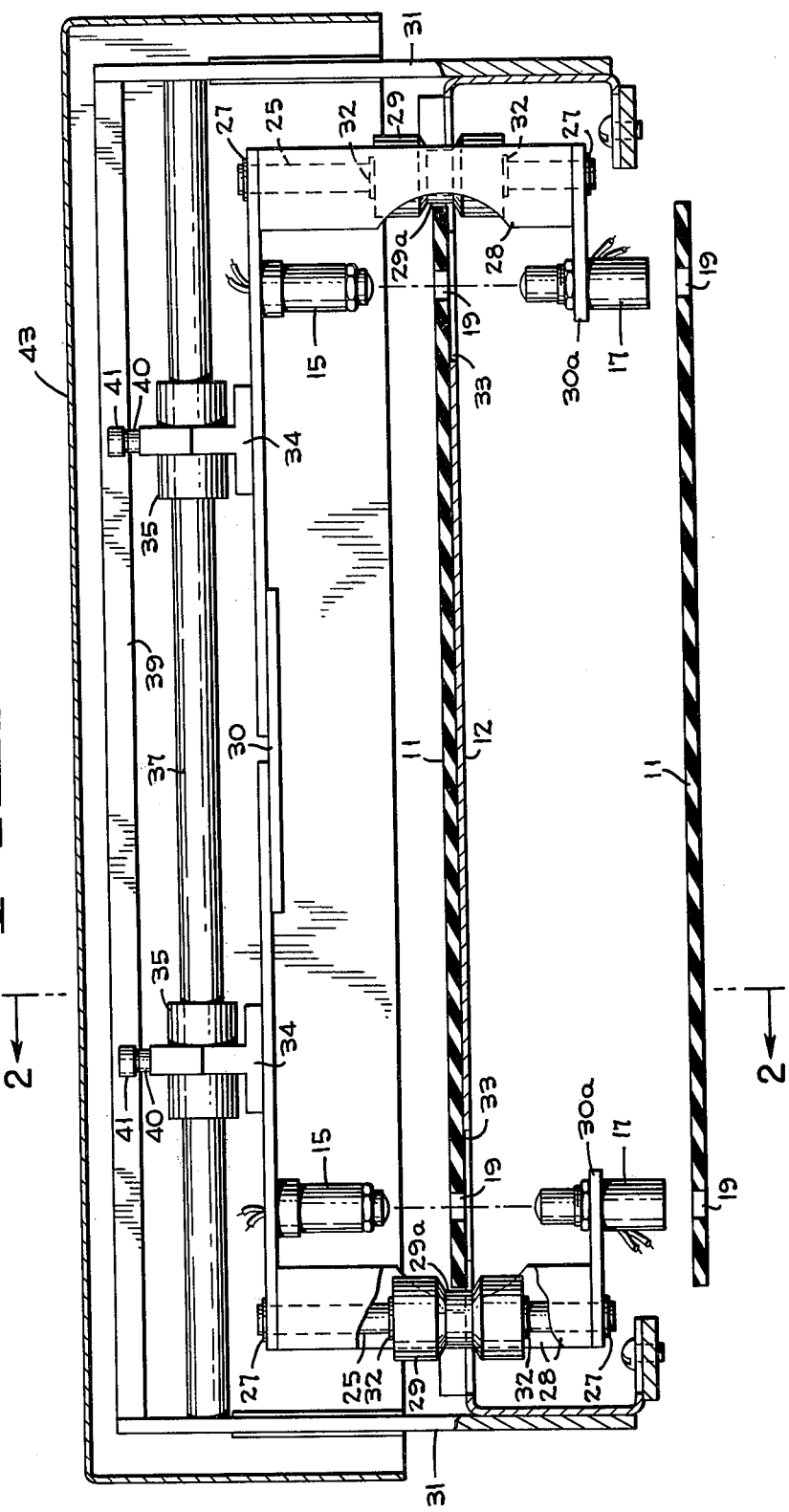

U.S. Patent May 11, 1976 Sheet 2 of 2 3,956,632
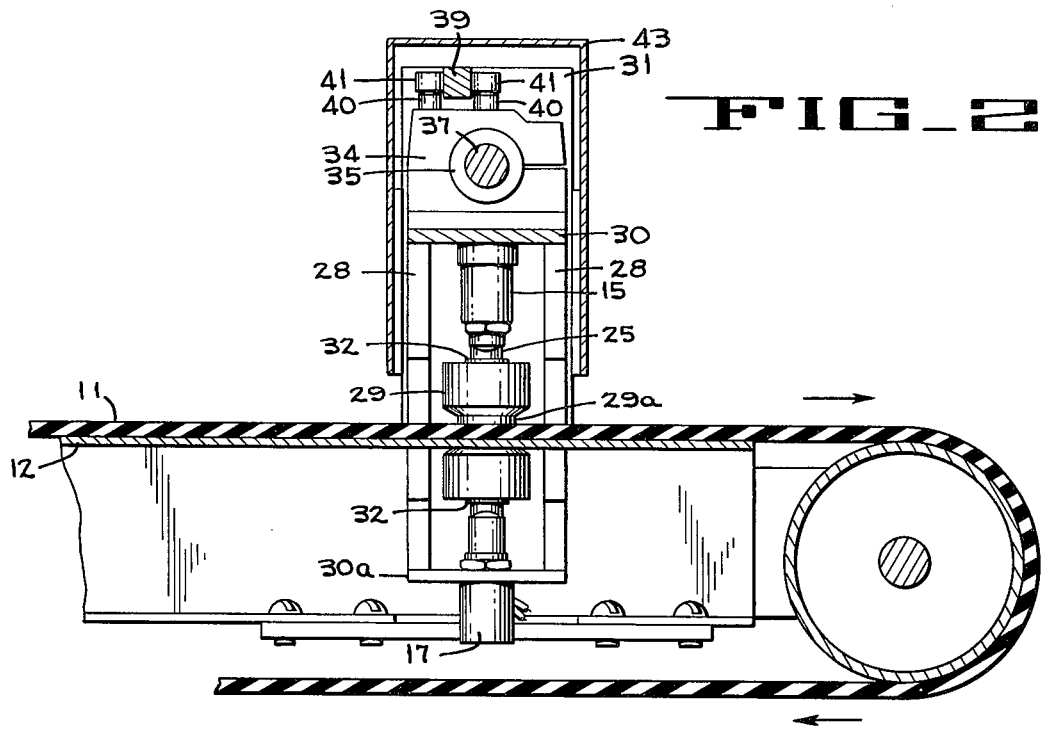
FIG_2
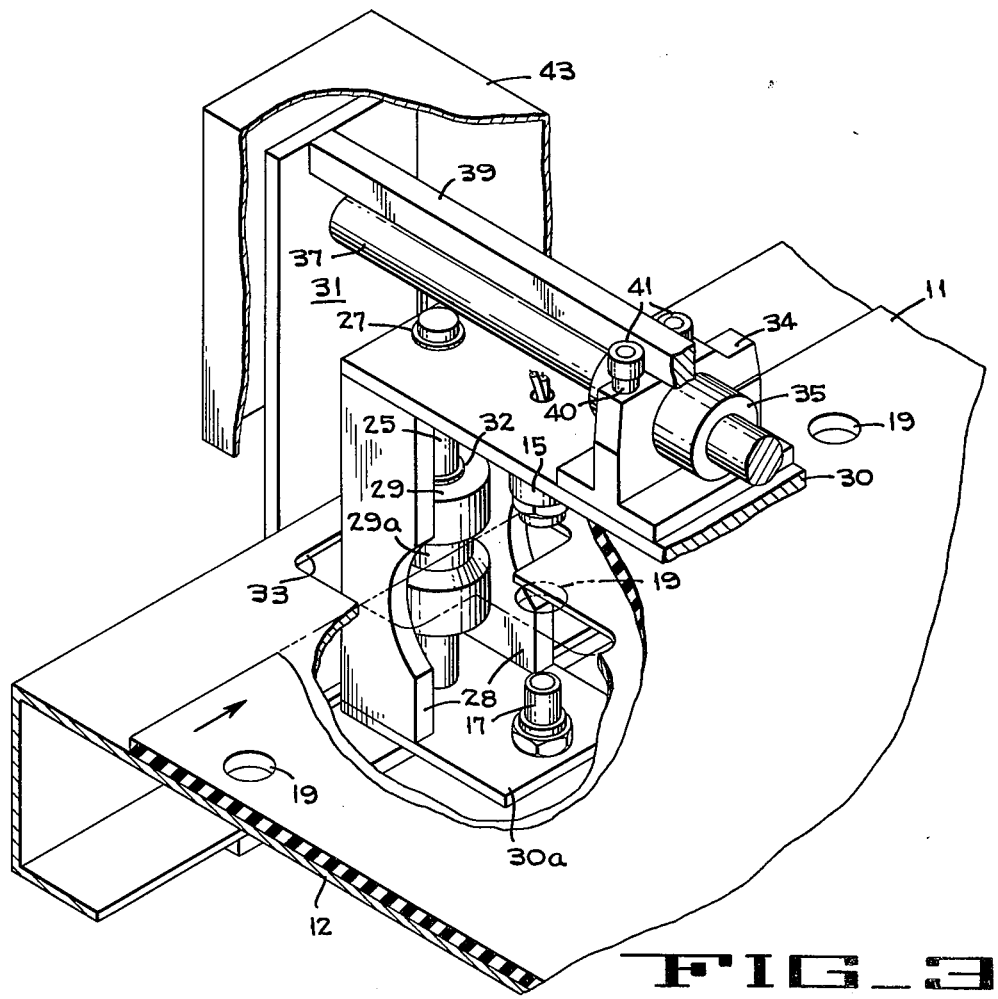
FIG_3

CONVEYOR BELT POSITION MONITORING DEVICE

BACKGROUND OF THE INVENTION

1. Field of the Invention

This invention pertains to devices for monitoring the longitudinal position of moving conveyor belts, and more particularly, to means for stabilizing the position of light sensing types of position monitoring means relative to a moving conveyor belt.

2. Description of the Prior Art

Where customer specialty orders are filled, requiring selection of a moderate number of products from among a large number of different available products, it is often useful to fill the orders by computer-controlled conveyor lines, with the different products being stored in dispensing magazines on either side of a conveyor line. For example, a series of orders may be placed on the conveyor with the orders being defined by preselected space allotments on the conveyor and with the selected products for each order being placed in the proper alloted conveyor space as the conveyor moves past the appropriate dispensing stations. In such an arrangement, it becomes important to carefully monitor the longitudinal movement of the conveyor so as to determine as precisely as possible at any given time its longitudinal position.

One means of indexing the longitudinal movement of a belt conveyor uses a light source and photodetector with the line-of-sight between the source and detector being oriented perpendicularly to the plane of the conveyor belt. Thus, the light rays associated with the photodetector are directed to pass through a linear series of small apertures in the conveyor belt, or they are arranged to be reflected from a linear series of light reflecting areas on the conveyor belt. One troublesome problem which arises with such an arrangement is the problem of precisely positioning the edge of the conveyor belt relative to the photodetector in order to assure accurate readings.

SUMMARY OF THE INVENTION

The solution to the foregoing problem which is provided by the present invention allows the light sensing means, i.e., the photodetector, to move so as to follow the transverse excursions of the belt. The subject invention generally comprises an apparatus for positioning the light sensing means relative to a linear series of light sensitive areas adjacent to the edge of the moving conveyor belt, and this apparatus includes the light sensing means; a substantially cylindrical roller positioned at each edge of the belt so that each roller rotates about its longitudinal axis in response to contact with the moving belt; a frame to which the light sensing means and the rollers are attached; and frame suspension means allowing the frame to move transversely to follow the transverse movements of the belt.

A primary object of the subject invention is the provision of means for positioning light sensing means relative to a linear series of light sensitive areas in and adjacent to an edge of a moving conveyor belt whereby the light sensing means may move transversely in response to transverse movements of the conveyor belt so that the line of sight of the light sensing means to the light source is always positioned correctly with respect to the series of light sensitive areas in the belt.

Additional objects and advantages of the present invention will become apparent from the following description and drawings.

BRIEF DESCRIPTION OF THE DRAWINGS

FIG. 1 is a transverse sectional view of a conveyor utilizing the position monitoring device of the present invention.

FIG. 2 is a section taken along line 2—2 of FIG. 1.

FIG. 3 is an isometric view of one of the side assemblies of the conveyor belt position monitoring device of the present invention with portions of the conveyor belt and frame structure being broken away for the purpose of clarity.

DESCRIPTION OF THE PREFERRED EMBODIMENT

As used herein, the term "light sensitive area" on a conveyor belt will denote either an aperture in the belt (as in the described and illustrated embodiment) or a spot of light reflecting material located on the same side of the conveyor belt as is the light source.

Referring to FIGS. 1 and 2, the upper run of a conveyor belt 11 is shown in a generally horizontal orientation. The upper run of the conveyor belt is supported from below by a belt stiffener 12, which is a metal plate used to hold the belt in an approximately planar position. A pair of light sources 15 are located above the upper run of the conveyor belt, and a pair of photodetectors 17 are located below said plane. The light from each of the light sources passes through a linear series of spaced apertures 19 (FIG. 3) in the belt, with no light being received by the corresponding photodetector 17 when one of the apertures is not located directly beneath the light source in the line of sight between light source and photodetector.

The longitudinal belt position monitoring means of the present invention includes a position sensing means provided adjacent each side edge of the belt, each of such sensing means comprising a pin 25 maintained in a vertical position by a retaining ring 27 at each end of the pin which ties the upper end of the pin to a segmented frame member 30 and the lower end of the pin to a short support plate 30a. A substantially cylindrical roller 29 is mounted for free rotation upon each of the pins 25, and each is held in a fixed vertical position relative to the corresponding pin by additional retaining rings 32. Each roller is provided at its mid-section with a groove 29a having conically shaped side surfaces, and the edges of the conveyor belt 11 are arranged to be received in these grooves (as shown in FIG. 1) with a lateral clearance between the edges of the belt and the rollers of perhaps 1/16th of an inch. The longitudinally moving belt is expected to be in contact with one or the other roller during much of its operating time due to the tendency of the belt to move transversely. The frame member 30, as shown in FIG. 1, extends across the conveyor, and holds the light sources 15 above the side edges of the belt. Each of the support plates 30a support one of the photodetectors 17 in position directly below the corresponding light source. These upper and lower support members are further stiffened and held together by a pair of brackets 28 located in front of and behind the rollers 29.

The belt stiffener 12 (FIG. 1) is provided with large apertures 33 on each side thereof to receive the rollers 29 and to allow for substantial transverse movement of said rollers relative to the belt stiffener, which is a part of the fixed conveyor frame structure.

Above the conveyor belt, the frame member 30 is rigidly connected by two pillow blocks 34 to a pair of spaced cylindrical ball bushings 35 slidably mounted on a transversely oriented shaft 37 which is supported by vertical side walls 31 attached to the belt stiffener 12. Above the shaft 37 and parallel to it, a bar 39 of substantially rectangular cross-section is supported by the vertical side walls 31. Rotatably mounted at the top of each pillow block 34 is a pair of rollers 41. These rollers are positioned adjacent to and in contact with said rectangular shaped bar 39, one roller being in contact with each side of said bar 39, as shown in FIG. 3. Each of the rollers 41 is rotatably connected by a coaxial shaft 40 to the associated pillow block 34 so as to guide the sliding movement and control the orientation of the bushing 35 along the shaft 37. A cover 43 surrounds and acts as a housing for the entire position monitoring apparatus of the present invention.

The operation of the apparatus is as follows. Referring to FIG. 3, the linear series of apertures 19 in one side of the belt 11 passes between the associated light source 15 and photodetector 17 so as to intermittently intercept the line of sight of the photodetector and light source. As the conveyor belt moves forwardly in a longitudinal direction, the apertures, therefore, intermittently allow light from the source 15 to reach the photodetector 17 and thereby generate a series of pulse signals from the photodetector, each two consecutive pulses corresponding to movement of the conveyor belt in the longitudinal direction by some fixed amount, e.g., six inches. However, as the belt 11 moves longitudinally it also exhibits a tendency to move in a transverse direction, albeit by small distances. These transverse excursions, if not corrected for, would often cause the linear series of apertures 19 to move transversely enough so that they no longer intercepted the line of sight between light source 15 and photodetector 17 whereby a light signal pulse could be missed. The improvement comprised by the present invention allows the photodetector to follow the transverse movements of the belt so that the linear series of apertures always intercepts the line of sight between light source and photodetector.

The rollers 29, which are used to sense the sideways movement of the belt, also act to reduce the tendency of the belt edges to fray or otherwise degrade. If the belt moves sideways, its edge will contact the roller on that side and will give rise to a transversely directed force on the roller and associated pin 25, transmitted through the frame member 30 to the two pillow blocks 34. The associated bushings 35 will then slide transversely along the shaft 37 in the direction of movement of the belt, and by approximately the same distance, as the belt moves. Only when the belt is not moving sideways will neither of the rollers located at the edge of the belt experience a transverse force; in this situation, the edges of the belt lie between and are very closely spaced from each of the rollers 29.

One may locate a light source 15 and photodetector 17 at only one edge of the conveyor belt or, alternatively, and as illustrated, locate a light source and photodetector at each edge of the belt. Where source 15 and photodetector 17 are located at each edge of the belt, one may stagger the locations of the linear series of apertures near each edge so as to obtain a closer determination of longitudinal position of the belt. That is to say, one set of apertures might be located, e.g., at longitudinal positions of 6 inches, 12 inches, 18 inches, 24 inches, etc. along one edge, and the other set of apertures might be located at longitudinal positions of 3 inches, 9 inches, 15 inches, 21 inches, etc.; with this choice, one or the other photodetector 17 receives a light pulse each time the belt moves through a longitudinal distance of 3 inches so that a finer determination of belt longitudinal position is available.

Although the best mode contemplated for carrying out the present invention has been herein shown and described, it will be apparent that modification and variation may be made without departing from what is regarded to be the subject matter of the invention.

What is claimed is:

1. In an apparatus for monitoring the longitudinal position of a moving conveyor belt, said conveyor belt being provided with a line of light sensitive areas longitudinally spaced therein adjacent to one edge of the belt; said apparatus comprising an appropriately oriented light source lying above said belt; light sensing means responsive to receipt of light from the light source and with the line of sight to said light source aligned substantially perpendicularly to the plane of the conveyor belt so that the line of sight is intercepted by each light sensitive area as the belt moves forward beneath the light source; the improvement comprising bracket means positioned adjacent to each edge of the belt; pin means mounted in an upright position on each bracket means; a substantially cylindrical roller mounted for free rotation upon each of said pin means, each roller being positioned adjacent to and substantially in contact with the corresponding edge of the belt so that each roller rotates about its longitudinal axis as the belt moves in engagement therewith, each roller including guide means for maintaining the vertical positions of the edges of the belt as the belt moves; frame means to which the light sensing means and the bracket means are attached; and frame suspension means, located above the conveyor belt, for supporting the frame means to allow the frame means to move transversely in response to transverse movements of the conveyor belt.

2. The improvement according to claim 1 wherein said guide means comprises a groove in the cylindrical surface of said rollers, each of said edges of said belt being received in a respective groove.

3. The improvement according to claim 1 wherein said light sensing means is a photodetector located on the opposite side of said belt from the light source, with said light sensitive areas of said belt comprising apertures in said belt which allow light from said light source to reach the photodetector.

4. The improvement according to claim 1 wherein the frame suspension means comprises a fixed frame lying above said frame means, and hanger means attached to said frame means and to said fixed frame for supporting said frame means from the fixed frame, said hanger means being mounted for transverse sliding movement on said fixed frame in response to application of a transversely directed force on said frame means.

5. The improvement according to claim 4 wherein said fixed frame comprises a transversely oriented shaft located above said frame means and extending generally parallel thereto, said hanger means comprising two cylindrical bushings spaced apart and mounted upon said transverse shaft for slidable movement along the shaft.

6. The improvement according to claim 5 wherein said fixed frame further comprises a guide bar adjacent to and parallel to the transversely oriented shaft, and wherein said hanger means further comprises guide bar rollers positioned adjacent to and on opposite side of each of said bushings for guiding the transverse movement of and controlling the orientation of said frame means.

7. A conveyor belt position monitoring device for monitoring the longitudinal position of a conveyor belt which is provided with a longitudinally arranged series of spaced light sensitive areas, said device comprising a frame extending transversely of said conveyor belt, a pair of transversely aligned rollers with one roller being positioned on each side of said belt, means for mounting each of said rollers on said frame for rotation about vertical axes, a photodetector attached to said frame for movement therewith, said photodetector being positioned with respect to said belt so as to receive light from said light sensitive areas when such areas are aligned vertically therewith, and means mounting said frame for transverse movement when said belt engages said rollers so as to allow said photodetector to follow said light sensitive areas during transverse excursions of the belt.

8. A conveyor belt position monitoring device according to claim 7 wherein said rollers are provided with grooves for receiving the side edges of said belt and for maintaining the vertical position of the belt edges.

9. A conveyor belt position monitoring device according to claim 7 wherein said means mounting said frame for transverse movement comprises a first transverse bar, slide means attached to said frame and arranged for sliding movement on said first transverse bar, a second transverse bar connected to said first transverse bar and extending generally parallel thereto, and roller means connected to said frame for engagement with the opposite sides of said second transverse bar in order to maintain said frame in the proper orientation with respect to said conveyor belt.

\* \* \* \* \*